US005284714A

United States Patent [19]

Anderson et al.

[11] Patent Number: 5,284,714

[45] Date of Patent: Feb. 8, 1994

[54] PHOTOGRAPHIC SUPPORT MATERIAL COMPRISING AN ANTISTATIC LAYER AND A HEAT-THICKENING BARRIER LAYER

[75] Inventors: Charles C. Anderson, Penfield; Wayne A. Bowman, Walworth; Billy R. Dotson, Spencerport, all of N.Y.

[73] Assignee: Eastman Kodak Company, Rochester, N.Y.

[21] Appl. No.: 20,957

[22] Filed: Feb. 22, 1993

Related U.S. Application Data

[62] Division of Ser. No. 980,416, Nov. 23, 1992, Pat. No. 5,221,598.

[51] Int. Cl.[5] .......... B32B 27/08

[52] U.S. Cl. .......... 428/474.5; 427/407.1; 427/419.2; 428/475.2; 428/702; 430/523; 430/527

[58] Field of Search .......... 427/407.1, 419.2; 428/475.2, 474.5, 702; 430/523, 527

[56] References Cited

U.S. PATENT DOCUMENTS

| | | |
|---|---|---|
| 2,486,192 | 10/1949 | Minsk et al. . |
| 2,533,166 | 12/1950 | Jones . |
| 2,968,558 | 1/1961 | Clavier et al. . |
| 3,033,679 | 5/1962 | Laakso et al. . |
| 3,437,484 | 4/1969 | Nadeau . |
| 3,525,621 | 8/1970 | Miller . |
| 3,630,740 | 12/1971 | Kerr et al. . |
| 3,681,070 | 8/1972 | Timmerman et al. . |
| 4,203,769 | 5/1980 | Guestaux . |
| 4,542,095 | 9/1985 | Steklenski et al. . |
| 4,916,011 | 4/1990 | Miller . |
| 4,999,276 | 3/1991 | Kuwabara et al. . |
| 5,006,451 | 4/1991 | Anderson et al. . |

*Primary Examiner*—Jack P. Brammer
*Attorney, Agent, or Firm*—Robert A. Gerlach

[57] ABSTRACT

A base for a photographic element is provided which comprises a support having disposed thereon a vanadium pentoxide antistatic layer and an overlying barrier layer of a heat-thickening polyacrylamide polymer having hydrophilic functionality, and a method for preparing it.

4 Claims, No Drawings

PHOTOGRAPHIC SUPPORT MATERIAL COMPRISING AN ANTISTATIC LAYER AND A HEAT-THICKENING BARRIER LAYER

This is a Divisional of application Ser. No. 980,416, filed Nov. 23, 1992, now U.S. Pat. No. 5,221,598.

FIELD OF THE INVENTION

This invention relates to photographic support materials having a layer which provides protection against the generation of static electrical charges and a barrier layer which overlies the antistatic layer.

BACKGROUND OF THE INVENTION

The photographic industry has long recognized the need to provide photographic film and paper with antistatic protection to prevent the accumulation of static charges during manufacture and use. Static charges can cause irregular fog patterns in photographic emulsions and various coating imperfections such as mottle patterns and repellency spots. Such charges also attract dirt and dust to the photographic element surface which may result in the formation of "pinholes" in processed films as well as a variety of handling and conveyance problems.

To prevent the problems arising from an accumulation of static charges, it is conventional practice to provide an antistatic layer (i.e., a conductive layer) in a photographic element. A wide variety of antistatic layers are known for use in photographic elements. For example, U.S. Pat. No. 3,033,679 discloses an antistatic layer comprised of an alkali metal salt of a copolymer of styrene and styrylundecanoic acid. Photographic films having a metal halide, such as sodium chloride or potassium chloride, as the conducting material in a hardened polyvinyl alcohol binder are described in U.S. Pat. No. 3,437,484. In U.S. Pat. No. 3,525,621, the antistatic layer is comprised of colloidal silica and an organic antistatic agent such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica, and a polyalkylene oxide is disclosed in U.S. Pat. No. 3,630,740 while U.S. Pat. No. 3,681,070 describes a copolymer of styrene and styrene sulfonic acid as an antistatic agent. U.S. Pat. No. 4,542,095 describes antistatic compositions comprising a binder, a nonionic surface-active polymer having polymerized alkylene oxide monomers, and an alkali metal salt. In U.S. Pat. No. 4,916,011, an antistatic layer comprising a styrene sulfonate-maleic acid copolymer, a latex binder, and a alkyl-substituted trifunctional aziridine crosslinking agent are disclosed.

It is known to prepare an antistatic layer from a composition comprising metal oxides, and particularly vanadium pentoxide as described, for example, in Guestaux, U.S. Pat. No. 4,203,769. Antistatic layers containing vanadium pentoxide provide excellent protection against static and are highly advantageous in that they have excellent transparency and their performance is not significantly affected by changes in humidity. It is also known to provide metal oxide layers, including vanadium pentoxide antistatic layers, with a protective overcoat layer such as a layer of a cellulosic material to provide abrasion protection and/or enhance frictional characteristics.

In some types of photographic elements, the antistatic layer is located on the side of the support opposite to the image-forming layers and it is not necessary for there to be any functional layers overlying the antistatic layer except for the optional inclusion of a protective overcoat layer. Vanadium pentoxide antistatic layers which may contain a polymeric binder are effectively employed with such elements and may serve as the outermost layer, or, optionally, may be provided with an overlying cellulosic layer which serves as a protective abrasion-resistant topcoat layer. In other types of photographic elements, however, the antistatic layer must function as both a subbing layer and an antistatic layer. Thus, for example, many photographic elements contain a gelatin-containing pelloid layer on the side of the support opposite to the image-forming layers in order to control curl. Such elements commonly contain a layer underlying the curl control layer which acts both as a subbing layer and an antistatic layer. Other photographic elements such as X-ray films are coated with silver halide emulsion layers on both sides and are provided with a layer which functions as both a subbing layer and antistatic layer underlying each silver halide emulsion layer. Serious difficulties are encountered when vanadium pentoxide antistatic layers are used as subbing layers. For example, silver halide emulsion layers and curl control layers do not adhere well to vanadium pentoxide antistatic layers and, as a consequence, delamination can occur. Vanadium pentoxide can diffuse from the subbing layer through the overlying emulsion layer or curl control layer into processing solutions thereby resulting in diminution or loss of the desired antistatic protection after the film is processed.

U.S. Pat. No. 5,006,451 discloses the application of a latex polymer barrier layer over a vanadium pentoxide antistatic subbing layer to prevent the loss of antistatic properties during processing and provide good adherence to subsequently applied hydrophilic colloid layers such as, for example, curl control layers. However, such latex barrier layers require use of significant quantities of high boiling organic solvent "coalescing aids" which tend to volatilize on drying resulting in coating imperfections, and lack of uniformity and adhesion of subsequently applied layers, as well as conveyance problems.

To insure coalescence of the latex polymer from its particulate latex form to a coherent film capable of acting as a barrier layer during the extremely short drying times used in high speed film support manufacture, significant concentrations of high boiling organic solvent "coalescing aids" are used in the latex formulation. Coalescing aids lower the glass transition of the latex polymer during drying, causing the latex particles to flow and form a film. While some of the coalescing aid remains permanently in the latex film, such materials also partially volatilize when the barrier coating is dried. Subsequent condensation of volatilized coalescing aid in cooler areas of the coating apparatus causes coating imperfections and conveyance problems. In addition, as a latex coalesces in the presence of coalescing aids, it is well known that some of the coalescing aid exudes to the surface of the coating. This surface layer of exuded high boiling organic compound (coalescing aid) can adversely effect the uniformity and adherence of subsequently applied layers such as photographic emulsions or curl control layers.

Further, latex barrier polymers in aqueous formulations, with or without the use of coalescing aids, are low viscosity liquids which do not increase in viscosity until nearly all of the water evaporates during the drying process. As the coating dries using conventional high temperature air impingement, the uniformity of the low viscosity liquid coating is disturbed, resulting in a non-uniform "mottled" layer by the time the coating is fully dried. In a photographic element, such non-uniformity causes serious problems, particularly because the mottle pattern can transfer to photographic emulsion or curl control layers when they are applied over the barrier layer.

Accordingly, an antistatic photographic film support comprising a vanadium pentoxide antistatic layer and a barrier layer therefor which does not require coalescing aids and does not exhibit drying-induced mottle patterns is desired.

SUMMARY OF THE INVENTION

The invention provides a base for a photographic element comprising a support containing an antistatic layer comprising vanadium pentoxide and an overlying barrier layer of a heat-thickening polyacrylamide polymer having hydrophilic functionality, and the photographic element.

The invention also comprises a method for preparing the base of the invention which comprises coating a support with a vanadium pentoxide antistatic layer and applying an aqueous solution of a heat-thickening polyacrylamide polymer having hydrophilic functionality as an overlayer on the antistatic layer.

The vanadium pentoxide antistatic support provides a humidity insensitive antistat. The barrier layer prevents the diffusion of vanadium pentoxide out of the antistatic layer, thereby providing permanent antistatic protection. The barrier layer also provides excellent adhesion to the antistatic layer which underlies it and to a hydrophilic colloid layer, such as a gelatin layer, which can overly it. The heat-thickening properties of the barrier layer of the invention also provide excellent coating uniformity, thereby obviating the non-uniformity which causes transfer of a mottle pattern to the photographic emulsion or curl control layers when they are applied over the barrier layer.

The antistatic photographic film support of the invention comprising a vanadium pentoxide antistatic layer and a barrier layer does not require coalescing aids. The advantages of the invention are all the more surprising in view of the fact that the barrier layer is a water soluble polymer.

DETAILED DESCRIPTION OF THE INVENTION

Photographic elements which can be protected against static by the practice of the invention can vary greatly in the structure and composition of the support, the number and composition of the image-forming layers, the kinds of auxiliary layers present, the materials used to form the various layers, and so on.

The photographic elements of the invention can be prepared on any suitable opaque or transparent photographic support including films of various kinds of glasses such as soda glass, potash glass, borosilicate glass, quartz glass and the like; paper, baryta coated paper, paper coated with alpha olefin polymers, synthetic paper e.g. of polystyrene, ceramics, metals, foils, synthetic high molecular weight film materials such as polyalkyl acrylates or methacrylates, polystyrene, polyamides such as nylon, films of semi-synthetic high molecular weight materials such as cellulose nitrate, cellulose acetate, cellulose acetate butyrate, and the like; homo and copolymers of vinyl chloride, poly(vinylacetal), polycarbonates, homo and copolymers of olefins such as polyethylene and polypropylene, and the like.

Polyester films are particularly advantageous because they provide excellent strength and dimensional stability. Such film supports are well known, widely used, and typically prepared from high molecular weight polyesters prepared by condensing a dihydric alcohol with a dibasic saturated fatty carboxylic acid or derivative thereof.

Suitable dihydric alcohols for use in preparing such polyesters are well known in the art and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexane dimethanol, and the like.

Suitable dibasic acids useful for preparing polyesters include those containing from two to sixteen carbon atoms such as adipic acid, sebacic acid, isophthalic acid, terephthalic acid and the like. Alkyl esters of acids such as those listed above can also be employed. Other alcohols and acids as well as polyesters prepared therefrom and the preparation of the polyesters are described in U.S. Pat. Nos. 2,720,503 and 2,901,466 which are hereby incorporated herein by reference. Poly(ethylene terephthalate) is preferred.

Support thicknesses ranging from about 0.05 to about 0.25 millimeter, preferably 2 to 10 mil (0.002–0.010 inch) can be employed with very satisfactory results.

Generally polyester film supports are prepared by melt extruding the polyester through a slit die, quenching to the amorphous state, orienting by transverse and longitudinal stretching, and heat setting under dimensional restraint. The polyester film can also be subjected to a heat relaxation treatment to improve dimensional stability and surface smoothness.

The support employed will typically contain an undercoat or primer (polymeric subbing) layer between the support and the antistatic layer. Subbing layers used to promote the adhesion of coating compositions to the support are well known and any such suitable material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; 3,501,301 and the like which are hereby incorporated herein by reference. The polymeric subbing layer is usually overcoated with a second subbing layer comprised of gelatin, typically referred to as a gel sub.

The advantageous properties of a vanadium pentoxide antistatic layer are described, for example, in U.S. Pat. No. 4,203,769 which is hereby incorporated herein by reference. The antistatic layer is generally prepared by coating an aqueous colloidal solution of vanadium pentoxide. Preferably, the vanadium pentoxide is doped with silver. A polymer binder such as a vinylidene chloride/methyl acrylate/itaconic acid terpolymer, an acrylonitrile/vinylidene chloride/acrylic acid terpolymer, and the like, is preferably employed to improve the integrity of the layer and adhesion. The weight ratio of polymer binder to vanadium pentoxide, can range from about 1:5 to 200:1, preferably 1:1 to 10:1. The antistatic coating formulation may also contain any suitable wetting aid to improve coatability.

The barrier layer employed in the present invention comprises a heat-thickening acrylamide polymer having hydrophilic functionality. The hydrophilic functionality selected to provide the desired heat-thickening behavior in combination with the required barrier properties and adherence, particularly to subsequently applied layers such as hydrophilic colloid layers, particularly gelatin-containing layers.

Optionally, the barrier layer composition can contain any suitable additional components including gelatin or other hydrophilic colloid, matte particles, wetting aids, crosslinking or hardening agents, mixtures thereof, and the like. Gelatin or hydrophilic colloidal materials are used to aid in controlling the hydrophilic/hydrophobic balance and simultaneously obtain excellent barrier performance and adhesion. Gelatin is usefully employed in amounts of up to about twenty-five percent of the combined weight of gelatin and the heat-thickening polymer. Matte particles such as colloidal silica or beads of polymeric resins such as polymethylmethacrylate, can be used to reduce the tendency for blocking to occur when the photographic support material is wound in roll form. A wetting agent is used to promote coatability. If desired, a crosslinking agent or hardener can be employed to crosslink the polymer and thereby render the barrier layer more durable. Particularly useful materials for this purpose include 2,3-dihydroxy-1,4-dioxane(DHD), bis(vinyl methyl)sulfone(BVSM), and the like and mixtures thereof.

The polyacrylamide barrier polymers of the invention exhibit heat thickening behavior in aqueous media with increasing temperature. This viscosity increase can be significant, resulting in the formation of a gel which exhibits no flow. Thus, heat-thickening polymers dried at high temperature rapidly set and dry without exhibiting the post-coating flow due to high temperature air impingement which results in mottling. Thus, a dried coating of the invention has superior uniformity, particularly compared against coatings derived from latex formulations, and is devoid of the mottling which can result when a latex polymer is employed. Further, the uniform coatings of the invention are obtained without the need for coalescing aids which remain in latex coating compositions.

The aqueous medium in which the polyacrylamides of the invention exhibit the heat-thickening property which characterizes them, may contain some organic solvent as desired. Accordingly, as used herein, the term aqueous medium encompasses a completely aqueous solvent as well as a medium containing predominantly aqueous solvent and any suitable water soluble solvent such as a lower alkyl alcohol (e.g., methanol, ethanol, isopropanol, and the like), tetrahydro-furan, acetone and the like, and mixtures thereof. A solvent other than water can be used at a weight percent less than about 50% of the total solvent, preferably less than 20%.

Preferred heat-thickening polyacrylamides of this invention have a hydrophobic group as well as a hydrophilic group. The hydrophilic group is a polymerizable water soluble ionic vinyl monomer, and the hydrophobic group is an acrylamide or methacrylamide monomer that can undergo free radical polymerization, which is insoluble in water, or forms homopolymers that are insoluble in water or which form polymers that exhibit LCST (lower critical solution temperature) properties. Many polymers precipitate from solution upon heating causing a sharp drop in both viscosity and light transmittance. The temperature at which this occurs is called the lower critical solution temperatures (LCST).

The preferred polyacrylamide polymers of the invention have the formula:

$$-(A)_{a'}(B)_{b'}(C)_{c'} \qquad (1)$$

where A represents recurring units derived from one or more hydrophobic N-substituted acrylamide or methacrylamide monomers of formula (2):

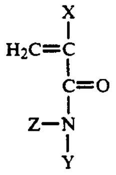

(2)

in which X=H or $CH_3$; Y=H or Z where Z is an alkyl substituent having 3 to 6 carbon atoms or a ketoalkyl radical having 3 to 6 carbon atoms where the keto group is between the terminal carbon atom of the alkyl radical, including (a) 3-carbon saturated alkyl substituents such as isopropyl, n-propyl, cyclopropyl, and the like;
(b) 4-carbon saturated alkyl substituents such as n-
(c) 5-carbon substituents such as n-pentyl, 1-methylbutyl, 2-methylbutyl, 3-methylbutyl, 1,1-dimethylpropyl, 2,2- dimethylpropyl, 1-ethylpropyl, 1,2-dimethylpropyl, cyclopentyl, 2,2-dimethylcyclopropyl, 2,3-dimethylcyclopropyl, 1,3-dimethylcyclopropyl, 2-methylcyclopropylmethylene, 1-methylcyclopropylmethylene, 1-methylcyclobutyl, 2-methylcyclobutyl, 3-methylcyclobutyl, cyclobutylmethylene, and the like;
(d) 6-carbon saturated alkyl substituents such as n-hexyl, cyclohexyl, all branched saturated isomers of hexyl, all branched saturated isomers of substituted cyclohexyl, cyclobutyl, cyclopropyl and the like having a total of six carbons;
(e) stereoisometric and optically active forms of above groups (a–d).
(f) phenyl or 1,1-dimethyl-3-oxo-butyl;
(g) combinations of any of the above;
(h) heteroatoms on the hydrophobic fragment.

When (A) of formula (1) is a single hydrophobic N-substituted acrylamide (rather than a combination), and Y of formula (2) is H, then a' has the following restrictions:

(a) 3-carbon substituents a'=90 to 99.9 mol %.
(b) 4-carbon substituents a'=50 to 95 mol %.
(c) 5-carbon substituents a'=40 to 95 mol %.
(d) 6-carbon substituents a'=40 to 95 mol %.

When (A) is a single hydrophobic N-substituted acrylamide and Y=Z=n-propyl, a'=50 to 99.9 mol %. When Z is 1,1-dimethyl-3-oxobutyl and Y of formula (2) is H, then a'=85 to 99 mol %.

When (A) is a combination of groups designated by Z, a' (the total mol % of the combination) ranges from 30 to 99.9%.

Preferred formula (2) monomers include N-isopropylacrylamide (IPA), N-t-butylacrylamide (TBA), N-(1,1-dimethyl-3-oxobutyl)acrylamide (DOA) and the like. Any other suitable formula (2) monomers can be used including, for example, N-n- butylacrylamide (NBA), N-sec-butylacrylamide (SBA), N-isobutylacrylamide (IBA), N-t-pentylacrylamide (TPA), and the like and mixtures thereof.

B of formula (1) represents recurring units of one or more ionic hydrophilic vinyl monomers of formula (3):

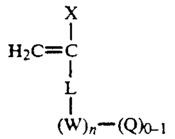

(3)

in which $X=H$ or $CH_3$,

L = 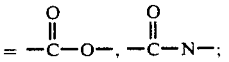;

W is straight or branched alkylene having 1 to 6 carbon atoms, n is 0 or 1 when n is 0, Q is $H_2$; when n is 1, Q is an ionic group including heterocyclic ionic groups such as imidazolium, thiazolium, pryidinium, as well as ionic groups including $-NH_3^+$, $-NH_2R^+$, $-NHR_2^+$, $-NR_3^+$, $=NR_2^+$, $-CO_2^-$, $-SO_2^-$, $-SO_3^-$, wherein R=lower alkyl of 1 to 10 carbon atoms, and any suitable associated counterions of these ionic groups including alkide, alkali metal, ammonium, halogen such as Cl, Br, and the like. b' ranges from 50 to 0.1 mol %.

Hydrophilic portion (B) is preferably selected from any class of vinyl monomer having an ionic group that can undergo free radical polymerization. Preferred are N-(3-aminopropyl)-1-methacrylamide HCl (APM), 3-acrylamidopropionic acid (APA), N-(2- sulfo-1,1-dimethylethyl)acrylamide, sodium salt (SSA), N-3-(N,N-dimethylamino)propylmethacrylamide HCl (DMM), acrylamide (AM), N- 2-carboxyethylacrylamide (CEA), 2-methyl-2-propenoic acid, sodium salt (SA).

Other representative monomers included in the definition of B include sodium acrylate, N 3-aminopropylmethacrylamide hydrochloride, p-styrenesulfonic acid sodium salt, N-3-dimethylaminopropylmethacrylamide hydrochloride, N-vinylimidazole hydrochloride, vinyl pyridine hydrochloride, N-2-sulfo-1,1- dimethylethylacrylamide sodium salt, 2-aminoethylmethacrylate hydrochloride, maleic anhydride, and the like. Q in formula (3) can contain one or more ionic groups of similar or opposite charge.

Hydrophilic monomer (B) may be partially substituted with other hydrophilic ionic monomers having the same or opposite charge as represented by formula (3).

C of formula (1) represents recurring units of one or more hydrophobic vinyl monomers capable of undergoing free radical polymerization other than those defined as A. c'=0 to 20 mol %.

Representative vinyl monomers include acrylic and methacrylic esters, styrene, substituted styrenes, acrylonitrile, 2-acetoacetoxy ethylmethacrylate, methyl-2-acrylamido-2-methoxy acetate, hydroxyethylmethacrylate and acrylate, hydroxy propyl methacrylate and acrylate, and the like.

Preferred polymers defined by formula (1) have a molecular weight ranging from about 20,000 to about 1,000,000, most preferably ranging from about 100,000 to about 350,000.

The antistatic layer comprising vanadium pentoxide is used in an amount sufficient to function as an antistat. The overlying barrier layer contains sufficient heat-thickening acrylamide polymer to retard diffusion of the vanadium pentoxide and provide sufficient hydrophilic functionality to make it receptive to and strongly adhered to by an aqueous coating composition applied to it.

The advantages of the invention are all the more surprising in view of the fact that the heat-thickening polyacrylamide barrier layer of the invention is a water soluble polymer. Generally, hydrophobic polymers, such as latex paint formulations, epoxy protective finishes and the like, serve as water-resistant barriers which are applied as water dispersible or organic solvent soluble formulations. A water soluble polymer would not be a likely candidate for an application in which the polymer must serve as a barrier for aqueous solution. It is therefore very surprising that the water soluble, heat-thickening barrier polymers of the invention meet the demanding requirements of protecting the vanadium pentoxide antistatic layer from aqueous film processing solutions.

The vanadium pentoxide antistatic layer and the overlying barrier layer can be coated on a support at any suitable coverage with optimum coverage for each layer depending on the particular photographic product desired. Typically, the antistat layer is coated at a dry coverage of from about 1 to 25 milligrams per square meter. The heat-thickening polyacrylamide barrier layer is preferably coated from an aqueous solution containing from about 0.5 to about 10 weight percent heat-thickening polymer to give a dry coverage of from about 50 to about 2000 milligrams per square meter. The dry coverage of the barrier layer is preferably from about 300 to 1000 milligrams per square meter.

Emulsions containing any suitable silver salt can be used to form the silver halide layers of the photographic elements of the invention. Such emulsions can be prepared using conventional techniques depending on desired end-use. Silver chloride, silver chlorobromide, silver bromide, silver bromoiodide, silver chlorobromoiodide and the like can be used as the silver halide.

Any known protective colloid can be used individually or in combination with gelatin, a water soluble gelatin substitute, or derivative of either of them, in the preparation of the photosensitive emulsion. Examples include gelatin (lime processed or acid processed), gelatin derivatives produced by reacting gelatin with other high polymers, albumin and casein, cellulose derivatives such as hydroxyethyl cellulose and carboxymethyl cellulose, sugar derivatives such as agar, sodium alginate and starch derivatives, polymeric materials such as polvinyl alcohol-hemiacetal, poly-N-vinyl pyrrolidone, polyacrylic acid, polyacrylamide, polyvinylimidazole, and the like. Other suitable gelatin derivatives are disclosed in U.S. Pat. Nos. 2,614,928; 2,763,639; 3,118,766; 3,132,945; 3,186,846; 3,312,553; 4,268,622; 4,059,448; 2,763,625; 2,831,767; 2,956,884; 3,879,205 and the like which are hereby incorporated herein by reference.

Known processes can be used to prepare the silver halide emulsion which can be coated by any suitable method. Coating methods include dip coating, curtain coating, roller coating, extrusion coating and the like as disclosed, for example in U.S. Pat. Nos. 2,681,294; 4,059,448; 2,761,791; 2,941,898 and the like which are hereby incorporated herein by reference. Two or more layers can be coated at the same time, if desired.

The silver halide emulsions can also contain any suitable compounds to increase speed, antifog, stabilize, harden, matte, lubricate, plasticize, brighten, sensitize, aid in coating, absorb UV, and so on.

Some suitable hardeners are disclosed, for example, in U.S. Pat. Nos. 1,870,354; 3,380,829; 3,047,394; 3,091,537; 3,325,287; 2,080,019; 2,726,162; 3,725,925; 3,255,000; 3,321,313 and 3,057,723, hereby incorporated herein by reference and the like.

Some suitable surface active agents which can be used as coating aids and to improve sliding properties and the like are disclosed, for example, in U.S. Pat. Nos. 3,294,540; 2,240,472; 2,831,766; 2,739,891; 2,359,980; 2,409,930; 2,447,750; 3,726,683; 2,823,123; and 3,415,649, hereby incorporated herein by reference and the like.

Photographic emulsions can also be spectrally sensitized with any suitable dyes including methine dyes and the like. Other suitable sensitizing dyes are disclosed, for example, in U.S. Pat. Nos. 2,231,658; 2,493,748; 2,503,776; 2,519,001; 2,912,329; 3,656,959; 3,694,217; 3,837,862; 3,814,609; 3,769,301; and 3,703,377, hereby incorporated herein by reference including combinations, particularly for supersensitization. The emulsion can also contain a dye having no spectral sensitizing action itself, or a material which does not absorb visible rays but which is capable of supersensitization.

Any suitable lubricating agents can be used including higher alcohol esters of higher fatty acids, casein, higher fatty acid calcium salts, silicone compounds, liquid paraffin and the like as described in U.S. Pat. Nos. 2,588,756; 3,121,060; 3,295,979; 3,042,522 and 3,489,567, hereby incorporated herein by reference and the like.

Any suitable plasticizer can be used such as glycerin, diols, trihydric aliphatic alcohols and the like particularly as described in U.S. Pat. Nos. 2,960,404 and 3,520,694, hereby incorporated herein by reference and the like.

Matting agents and antifoggants known in the art can be used including those disclosed in U.S. Pat. Nos. 2,322,037; 3,079,257; 3,022,169; 2,336,327; 2,360,290; 2,403,721; 2,728,659; 2,732,300; 2,735,765; 2,418,613; 2,675,314; 2,710,801; 2,816,028; 3,457,079; and 2,384,658, hereby incorporated herein by reference and the like.

Any ultraviolet light-absorbing agents such as the compounds of the benzophenone series, the benzotriazole series, the thiazolidine series and the like can be used. Any brightening agents can be used including agents of the stilbene series, the triazine series, the oxazole series, the coumarin series and the like.

The photographic elements of the invention are particularly useful in radiographic or X-ray elements which require very fast processing times as described, for example, in U.S. Pat. No. 4,900,652 which is hereby incorporated herein by reference. Because the unique barrier layers of the invention need not contain the high boiling organic coalescing aids required for latex barrier layers, they can be processed easily and effectively, even when fastest processing conditions are employed. It is to be understood, however, that they also provide the advantages described herein when slower processes or processing conditions are employed and are particularly advantageous when used in color film, graphic arts films, micrographics, and so on.

Any desired development chemistry can be employed. In one embodiment, the photographic element is developed, fixed, and washed in a 90 second 35 C process cycle which allows only about 30 seconds for each step. This embodiment is used in the examples below.

The development step employs a developer/replenisher containing about 700 ml water, 15.8 ml strontium chloride hexahydrate, 8.8 mg lithium carbonate, 12.5 mg Lignosite 458[Georgia Pacific]), 0.06 g of 5-methyl-benzotri-azole, 8.85 g of sodium metabisulfite, 42.75 g of potassium hydroxide as a 45% solution, 0.56 g of boric anhydride 60 mesh (boron oxide), 4.74 g of anhydrous sodium carbonate, 3.75 g of anhydrous sodium bicarbonate, 10 g of diethylene glycol, 133.5 g of potassium sulfite (45% solution), 5.33 g of diethylenetriaminepentaacetic acid pentasodium salt (40% solution), 22 g of hydroquinone, 12.5 g of glacial acetic acid, 1.35 g of 1-phenyl-3-pyrazolidinone, 127 mg of 5-nitroindazole, 8.85 g of glutaraldehyde (50% solution), 3.45 g of sodium bromide, and sufficient water to make 1 liter at a pH at 27 C of 10±0.1. The developer contains sulfite which renders the dye colorless and hydroxide and water at pH 10 to bleach the dye.

Alternatively, the developer can be a high pH (11.3) developer containing contrast enhancing amino compounds as described in U.S. Pat. No. 4,269,929, which is hereby incorporated herein by reference. This high contrast developer for graphic arts film at the high pH represents the worst case for dissolution of the vanadium pentoxide antistat and is employed in the examples below.

The fixing step employs about 600 ml water, 20.7 g of glacial acetic acid, 4 g of sodium hydroxide (50% solution), 8.8 mg of anhydrous lithium carbonate, 15.8 mg of strontium chloride (hexahydrate), 238.8 g of ammonium thiosulfate (56.5% ammonium thiosulfate, 4% ammonium sulfite), 0.8 g of potassium iodide, 35.5 g of anhydrous sodium thiosulfate, 4.9 g of sodium metabisulfite, 3.23 g of sodium gluconate, 23.15 g of aluminum sulfate (25% solution), and sufficient water to make 1 liter at a pH at 27 C of 4.1±0.1. The fixer solution contains the thiosulfate which dissolves and removes the undeveloped silver salts.

Any other processes and processing conditions known for developing photographic light-sensitive materials can be used to process the photographic elements of the invention including any of those disclosed in U.S. Pat. No. 4,059,448 incorporated herein by reference.

The barrier layer described herein provides improved adhesion to an overlying silver halide emulsion layer as compared to the poor adhesion obtained when prior overlying layers are coated directly over the vanadium pentoxide layer. To obtain even further improvement in adhesion, a very thin gelatin layer or layer of a hydrophilic colloid can be applied between the barrier layer and the emulsion or curl control layer. A typical dry coverage for such a thin layer is about 50 to 100 milligrams per square meter, preferably about 80 milligrams per square meter.

The barrier layers of the invention also provide excellent coating uniformity. This is particularly important when used with curl control layers which are typically employed on the backside of photographic films to prevent the film from curling toward the photographic emulsion side of the film, especially under low humidity conditions. In addition to promoting film flatness, these curl control layers typically include various dyes to provide backside antihalation protection. When the barrier layer described, for example, in U.S. Pat. No. 5,006,451 are overcoated with dye-containing curl control layers, the non-uniformities created in the latex barrier layer as a result of the drying process can be transferred to overlying layers. Thus the antihalation properties of the curl control layer may be non- uniform. In certain applications, for example in the graphic arts industry, the film exposure may be made through the backside of the film. Accordingly, non-uniformities in the antihalation layer can result in non-uniform exposures and therefore poor image quality in the processed film. When a photographic emulsion layer is coated over a non-uniform latex barrier layer, the non-uniformities can be transferred to the emulsion, resulting in undesirable image quality in the exposed and processed film. Consequently, it is vitally important that the barrier layer for the vanadium pentoxide antistatic layer of the invention provides excellent coating uniformity.

The invention is further illustrated but is not intended to be limited by the following examples in which all parts and percentages are by weight unless otherwise indicated.

EXAMPLE 1

Preparation of N-t-butylacrylamide/N-(3-aminopropyl)-1-methacrylamide HCl (84:16)

Methanol (3500 g) and distilled water (1500 g) are added to a 12 liter flask fitted with a condenser and degassed with nitrogen for 20 minutes. Tertiary butyl acrylamide (TBA) (1067 g) and aminopropyl methacrylamide hydrochloride (APM) (285 g) are added and the temperature is raised to 60° C. About 2 grams of 2,2′-azobis(2-methylpropionitrile) initiator are added and stirring at 60° under nitrogen is continued for 16 hours to yield a hazy, viscous solution. Six liters of distilled water is added and the temperature is raised to 75°. The condenser is removed and the contents of the flask are stirred at 75° with a fast nitrogen sweepdeg° for 24 hours to remove the methanol. Three liters of distilled water are added and the polymer is removed from the flask while hot to avoid gelation which occurs at about 40° C. The polymer solution contains 13.2% solids and has an inherent viscosity of 1.02 in 0.1M LiCl in methanol.

EXAMPLES 2–41

A polyethylene terephthalate film support subbed with a terpolymer latex of acrylonitrile, vinylidene chloride, and acrylic acid (100 mg/$m^2$) is coated with an aqueous antistatic formulation containing 0.025 weight percent of silver-doped (4%) vanadium pentoxide, 0.075 weight percent of a terpolymer latex of methylacrylate, vinylidene chloride, and itaconic acid (15/2/83), and 0.01 weight percent of a para-isononylphenoxypolyglycidol containing about 10 glycidiol units (nonionic surfactant 10G, Olin Mathieson Chemical Co) using a doctor blade. The coating is dried for 2 minutes at 100° C. to yield an antistatic layer having a dry weight of about 8 milligrams per square meter.

A variety of heat-thickening polyacrylamide polymers as identified in Table 1 are prepared as described in Example 1. An aqueous solution containing 2 to 6 weight percent of the heat- thickening polymer, 0.01 weight percent of 10G surfactant, and a crosslinking agent as indicated in Table 1, was coated over the antistatic layer and dried for three minutes at 100° C. to yield a clear barrier layer having a dry weight of 400 to 1400 milligrams per square meter as indicated in Table 1.

Products of the invention were tested for permanence of antistatic properties after processing in conventional film developing and fixing solutions and compared against a control sample containing an antistatic layer without a barrier layer.

The samples were soaked in high pH (11.3) developing and fixing solutions as described in U.S. Pat. No. 4,269,929, at 38° C. for 60 seconds each and then rinsed in distilled water. The internal resistivity of the processed sample at 20% relative humidity is measured and compared with the internal resistivity before processing. The results are reported in Table 1. As the Table shows, by proper choice of hydrophobic and hydrophilic monomers, composition, addition of crosslinking agent, and total barrier layer coating weight, depending on end use/processing conditions, one can obtain excellent antistatic properties as indicated by low resistivity values as measured using the salt bridge method, less than 10 log ohm/square at 20% relative humidity, both before and after processing. Under conditions of the examples, particularly good results were achieved for examples, 2, 5, 7, 9, 10, 13, 17–19, 22, 26, and 37–41.

EXAMPLES 42–49

An antistatic layer and a barrier were prepared as described in Examples 2–41. As indicated in Table 2, in some cases the barrier layer was overcoated with a thin gelatin subbing layer at a dry coating weight of 80 milligrams per square meter. The barrier layer or the gel subbing layer was then overcoated with 5 grams per square meter of gelatin curl control layer hardened with BVSM hardener and 10G surfactant. A control sample contains an overcoating of the described curl control layer over the antistatic layer without a barrier layer of the invention.

The test samples were evaluated for barrier performance as described in Examples 2–41 and for adhesion of the gelatin curl control layer.

Dry adhesion was determined by scribing small hatch marks in a coating with a razor blade as in standard paint and coating testing, placing a piece of high tack tape over the scribed area and then quickly pulling the tape from the surface. The amount of the scribed area removed is a measure of the dry adhesion.

Wet adhesion was determined by placing a test sample in developing and fixing solutions at 35° C. for 30 seconds each and then rinsing in distilled water. While still wet, a one millimeter wide line was scribed in the curl control layer and a finger was rubbed vigorously across the scribe line. The width of the line after rubbing was compared to the width before rubbing to provide a measure of wet adhesion.

As the results shown in Table 2 illustrate, the barrier polymers of the invention simultaneously provide permanence of antistatic properties and excellent adhesion to a gelatin layer such as a curl control layer or photographic emulsion.

EXAMPLE 50

This example demonstrates that the polymers of the invention provide uniform coatings rather than the mottled pattern that often results when prior latex polymers containing coalescing aids are used as barrier layers.

The heat-thickening polymer of Examples 46–49, shown to provide both permanence of antistatic properties and excellent adhesion to a gelatin layer, was tested and compared for coating uniformity when applied in a heat-setting operation against the methylacrylate/vinylidene chloride/itaconic acid latex barrier polymer described in Examples 34–72 of U.S. Pat. No. 5,006,451.

TABLE 1

| Example No. | Polymer | Composition | Barrier Performance | Coating Wt mg/sq m | Wt % Crosslinker | log ohm/sq Before | log ohm/sq After |
|---|---|---|---|---|---|---|---|
| 2 | IPA/APM | 95/5 | Good | 1400 | 9% DHD | 9.60 | 9.30 |
| 3 | DOA/APM | 90/10 | Poor | 750 | None | 8.30 | 10.70 |
| 4 | DOA/APM | 90/10 | Fair | 1250 | None | 8.30 | 9.80 |
| 5 | DOA/APM | 90/10 | Good | 750 | 9% DHD | 8.40 | 8.90 |
| 6 | DOA/APM | 90/10 | Fair | 1250 | 5% DHD | 8.80 | 9.70 |
| 7 | TBA/DOA/APM | 75/10/15 | Good | 500 | None | 7.55 | 7.75 |
| 8 | TBA/DOA/APM | 75/10/15 | Poor | 400 | None | 7.00 | 10.60 |
| 9 | TBA/AM/APM | 80/15/5 | Good | 750 | 5% DHD | 10.10 | 10.10 |
| 10 | TBA/AM/APA/APM | 65/25/5/5 | Good | 750 | None | 7.70 | 7.60 |
| 11 | TBA/SA | 50/50 | Poor | 750 | None | 9.10 | 13.00 |
| 12 | TBA/SA | 50/50 | Poor | 1400 | None | 7.90 | 13.50 |
| 13 | TBA/IPA/AM | 30/30/40 | Good | 1400 | None | 8.70 | 8.90 |
| 14 | TBA/IPA/AM | 30/30/40 | Poor | 750 | None | 8.30 | 13.00 |
| 15 | TBA/IPA/AM/SSA | 40/40/15/5 | Poor | 750 | None | 8.60 | 13.50 |
| 16 | TBA/IPA/AM/SSA | 40/40/15/5 | Poor | 1400 | None | 7.30 | 11.70 |
| 17 | TBA/IPA/APM | 75/10/15 | Good | 750 | None | 7.80 | 8.10 |
| 18 | TBA/IPA/APM | 65/20/15 | Good | 500 | None | 7.70 | 9.10 |
| 19 | TBA/IPA/APM | 65/20/15 | Good | 750 | None | 7.80 | 8.10 |
| 20 | TB/HEMA/SSA/MAM | 60/15/5/20 | Poor | 750 | 5% DHD | 9.20 | 13.50 |
| 21 | TB/HEMA/SSA/MAM | 60/15/5/20 | Poor | 1400 | 9% DHD | 9.70 | 12.10 |
| 23 | TBA/APM | 86/14 | Good | 750 | 1% BVSM | 8.60 | 8.70 |
| 24 | TBA/APM | 86/14 | Good | 750 | 2.5% BVSM | 9.00 | 9.00 |
| 25 | TBA/APM | 86/14 | Good | 750 | 1.2% DHD | 9.30 | 9.40 |
| 26 | TBA/APM | 86/14 | Good | 750 | 6% DHD | 9.60 | 9.60 |
| 27 | TBA/SSA | 70/30 | Poor | 750 | None | 8.90 | 12.50 |
| 28 | TBA/SSA | 70/30 | Poor | 1400 | None | 9.60 | 11.20 |
| 29 | TBA/SSA/AEMA | 60/30/10 | Poor | 750 | 5% DHD | 8.50 | 13.50 |
| 30 | TBA/SSA/AEMA | 60/30/10 | Poor | 1400 | 9% DHD | 9.40 | 11.80 |
| 31 | TBA/SSA/AEMA | 80/10/10 | Poor | 750 | None | 7.90 | 13.50 |
| 32 | TBA/SSA/AEMA | 80/10/10 | Poor | 1250 | None | 7.80 | 13.50 |
| 33 | TBA/SSA/AEMA | 80/10/10 | Poor | 750 | 5% DHD | 8.30 | 13.50 |
| 34 | TBA/SSA/AEMA | 80/10/10 | Poor | 750 | 9% DHD | 7.40 | 13.50 |
| 35 | TBA/SSA/AEMA | 80/10/10 | Poor | 1250 | 5% DHD | 7.60 | 13.50 |
| 36 | TBA/SSA/AEMA | 80/10/10 | Poor | 1250 | 9% DHD | 7.60 | 13.50 |
| 37 | TBA/SSA/AEMA | 85/5/10 | Good | 750 | None | 8.70 | 9.20 |
| 38 | TBA/SSA/AEMA | 85/5/10 | Good | 750 | 5% DHD | 7.90 | 8.80 |
| 39 | TBA/SSA/AEMA | 85/5/10 | Good | 750 | 9% DHD | 7.50 | 8.10 |
| 40 | TBA/SSA/AEMA | 85/5/10 | Good | 1250 | 5% DHD | 7.60 | 7.80 |
| 41 | TBA/SSA/AEMA | 85/5/10 | Good | 1250 | 9% DHD | 7.70 | 7.80 |
| Control | | | Poor | | | 8.10 | 13.50 |

TABLE 2

| Example No. | Polymer | Composition | Coating Wt mg/sq m | Wt % Crosslinker | Gel Sub | Barrier Performance | Adhesion Dry | Adhesion Wet |
|---|---|---|---|---|---|---|---|---|
| 42 | TBA/AM/APA/APM | 65/25/5/5 | 500 | No | No | Good | Slight Failure | No Failure |
| 43 | TBA/AM/APA/APM* | 65/25/5/5 | 500 | No | No | Poor | No Failure | No Failure |
| 44 | TBA/IPA/APM | 75/10/15 | 500 | No | No | Good | No Failure | Trace Failure |
| 45 | TBA/AM/APM | 80/15/5 | 750 | 5% DHD | No | Good | No Failure | No Failure |
| 46 | TBA/APM | 84/16 | 750 | 5% DHD | Yes | Good | No Failure | No Failure |
| 47 | TBA/APM | 84/16 | 750 | 5% DHD | No | Good | No Failure | Trace Failure |
| 48 | TBA/APM | 84/16 | 750 | 5% DHD | Yes | Good | No Failure | No Failure |
| 49 | TBA/APM | 84/16 | 1200 | 9% DHD | Yes | Good | No Failure | No Failure |
| Control | | | | | | Poor | Poor | Poor |

*plus 20% gelatin based on polymer

Coating solutions were applied to provide a dry coating weight of 500–2000 mg/$m^2$ on a moving polyester film base subbed with an itaconic terpolymer as described above from a coating hopper and immediately dried by impingement with air at 95° C. in a drying chamber. The coating solutions contained 0.5 to 1 weight percent of polymer and about 0.1% of a soluble blue dye to highlight coating uniformity. The heat-thickening barrier layers provided excellent uniformity while the latex barrier layers showed significant drying mottle.

Other barrier layers of the invention described herein can be substituted for a counterpart in the above examples with similar results.

Although the invention has been described in considerable detail herein, it is to be understood that such detail is solely for the purpose of illustration and that variations can be make without departing from the spirit and scope of the invention except as set forth in the claims.

What is claimed is:

1. A method for preparing a base for a photographic element which comprises coating a support with a vanadium pentoxide antistatic layer and applying an aqueous solution of a heat-thickening polyacrylamide polymer having hydrophilic funtionality as a overlayer on the antistatic layer.

2. The method of claim 1 which comprises applying a subbing layer to the support and coating the antistatic layer on the subbed support.

3. The method of claim 1 wherein the aqueous solution contains less than about 50% of the total aqueous medium of a solvent other than water.

4. The method of claim 3 wherein the aqueous solution contains less than about 20% of the total aqueous medium of a solvent other than water.

* * * * *